May 13, 1930.  J. SCHMIDT  1,758,064
APPARATUS FOR TREATING FOOD MATERIALS
Filed March 10, 1926   4 Sheets-Sheet 2

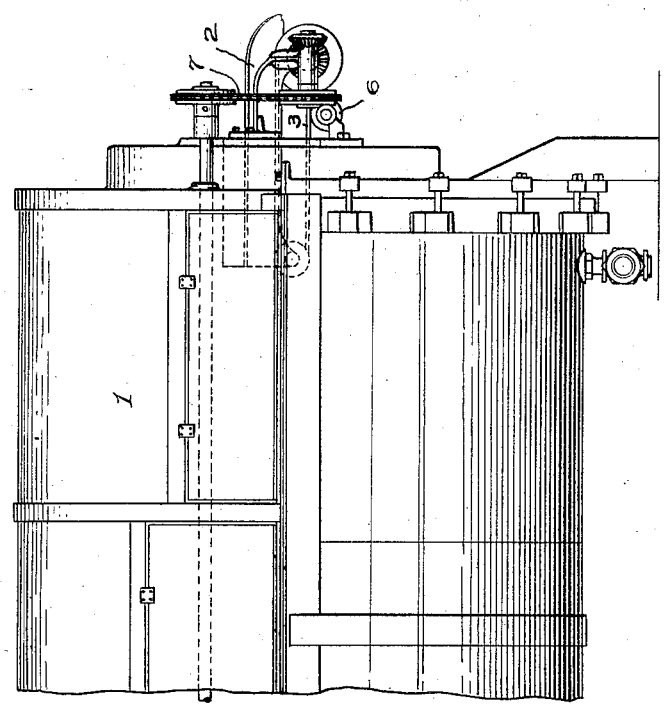
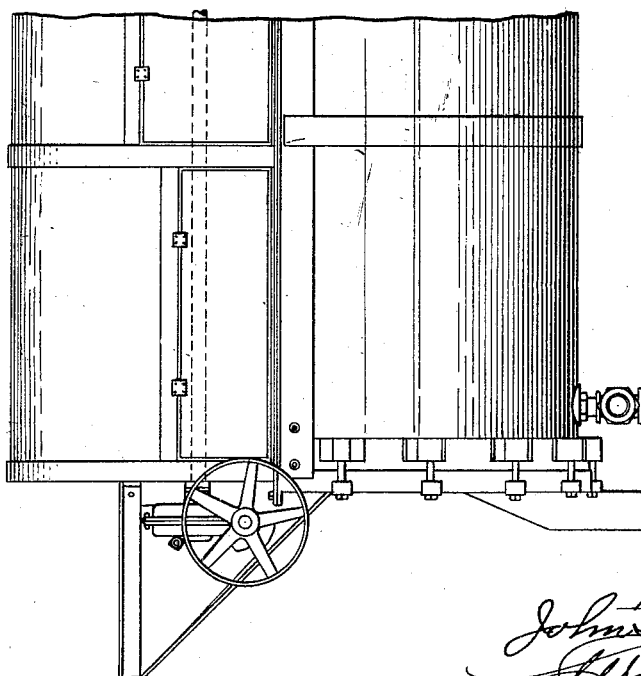
Fig. 1

May. 13, 1930. J. SCHMIDT 1,758,064
APPARATUS FOR TREATING FOOD MATERIALS
Filed March 10, 1926 4 Sheets-Sheet 4

Patented May 13, 1930

1,758,064

UNITED STATES PATENT OFFICE

JOHN SCHMIDT, OF HOOPESTON, ILLINOIS, ASSIGNOR TO SPRAGUE-SELLS CORPORATION, OF HOOPESTON, ILLINOIS

APPARATUS FOR TREATING FOOD MATERIALS

Application filed March 10, 1926. Serial No. 93,646.

This invention relates to a machine for blanching and treating green peas, lima beans, kidney and navy beans, string beans, beets and like vegetables.

In the canning art various machines are used for preparing the vegetables, washing and cleaning them and otherwise treating them. Among these machines is what is technically termed blanchers. These are machines in which a bath of hot water is maintained, or sometimes steam, and through which the products are passed for the purpose of, "scalding or boiling off", to soften and remove objectionable matter from the surfaces of the material, and to make the product flexible so it will pack without undue breakage or mutilation and to obtain a more uniform color throughout the mass.

In the operation of machines of this general type there has been much difficulty encountered in producing a machine that will handle and discharge successfully all of the various kinds of products that it is desired to treat. The main difficulty has been in the proper discharge of the material after treatment.

There are three different kinds of blancher discharge methods in use at this time, namely, the bucket and chute type; the bucket and spiral type; and the bucket and cone type.

The reason for these various types of discharge apparatus is because there is no one device that will successfully handle all kinds and types of products that are treated in this manner.

The bucket and chute type and the bucket and cone type will not handle string beans successfully on account of the tendency of the beans to bunch and bridge up at the mouth of the discharge. The bucket and spiral type will not handle young and tender peas without crushing and mutilating them. There are also objections to the several types when handling certain other materials. Another inherent trouble in blanchers as previously constructed resides in the manner of feeding the material to the blancher screen. In previous machines it has been difficult to prevent such material as peas, shelled beans and like product from finding its way down between the blancher screen and the outer shell and becoming mashed and mutilated on the way and eventually requiring a thorough cleaning of the machine before further operation. The point of greatest trouble from this cause is at the feed end of the machine where the rotary screen joins the fixed outer shell. It is desirable not to have any rubbing contact between the screen and shell and the slight clearance space usually provided has admitted more or less material to find its way through this clearance space.

To obviate this trouble I provide a specially constructed feed chute and extension to the screen member that overlap in such a manner that material cannot find its way into the space between the screen and shell.

It is therefore an object of my invention to produce a discharge device that will successfully handle any or all of the various products passed through this type of machine. It is also an object of my invention to provide a feed device for delivering material to the blancher screen in a manner to prevent loss of material and mutilation due to material finding its way between the screen and outer shell.

It is a further object of my invention to produce a device of the nature mentioned that will be of simple and practical construction; that will in no manner injure or mutilate the tenderest of vegetables or fruits passed therethrough; that will provide discharger capacity sufficient to permit uniform movement of the material without bunching or bridging the opening and that may be operated at any desired speed and still function successfully to permit handling large quantities of material in the minimum time; to save the loss of time and material due to stoppage for changing discharge devices or to the clogging of material due to too small an opening at the discharge end of the machine.

With such objects in view as well as other advantages inherent in the invention, I wish it understood that the several necessary elements and combinations constituting the same may be varied in their proportions, placement, general arrangement and operative relation without departing from the nature of the invention, also that the described devices are simply embodiments of the invention which other structures might employ without departing from the purview of the invention, and I regard myself as entitled to such variations from the shown and described devices as fall within the scope and meaning of the claims hereto appended.

Reference being now had to the accompanying drawings a better and clearer understanding of the invention will be had. The drawings herewith are more or less diagrammatic in character; are not necessarily to scale and do not necessarily represent the preferred or the best engineering practices in the construction of apparatus of this nature. The invention as illustrated is in a preferred form and clearly indicates how the invention may be applied to a concrete form or machine.

The improvements disclosed by this application have been applied to a machine of the type and character of that shown in the Steere Patent 1,290,396, dated January 7, 1919, and in lieu of this, some structural details have been omitted from my drawings accompanying this application which form no part of my invention and which are clearly shown and described in the said Steere patent.

Figure 1 is an elevation of a complete machine of the blancher type with my improved discharge device incorporated in the construction.

Figure 5:
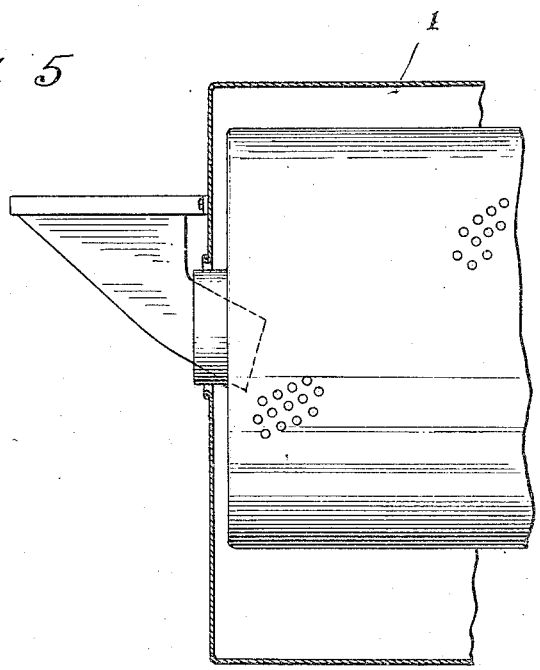
Figure 5 is a side elevation of the feed end of a blancher showing more clearly the exact location and shape of the improved feed chute.

A machine of the blancher type is indicated by the numeral 1. This machine comprises an inner and an outer shell with the inner shell set eccentric to the outer shell as is indicated in Figure 5, the inner shell is technically called the "drum", or "blanching", cylinder and is mounted for continuous rotation so that the material being treated is tumbled over and over and thoroughly washed and blanched in its passage through the machine. The outer cylinder contains the hot water of sufficient height to properly treat the material. The construction of the blancher drum is such that the material placed therein is constantly urged toward the discharge end as the drum is rotated. Since the general construction and operation of the blancher proper is not a part of my invention I will not go further into its details of construction.

Figure 2:
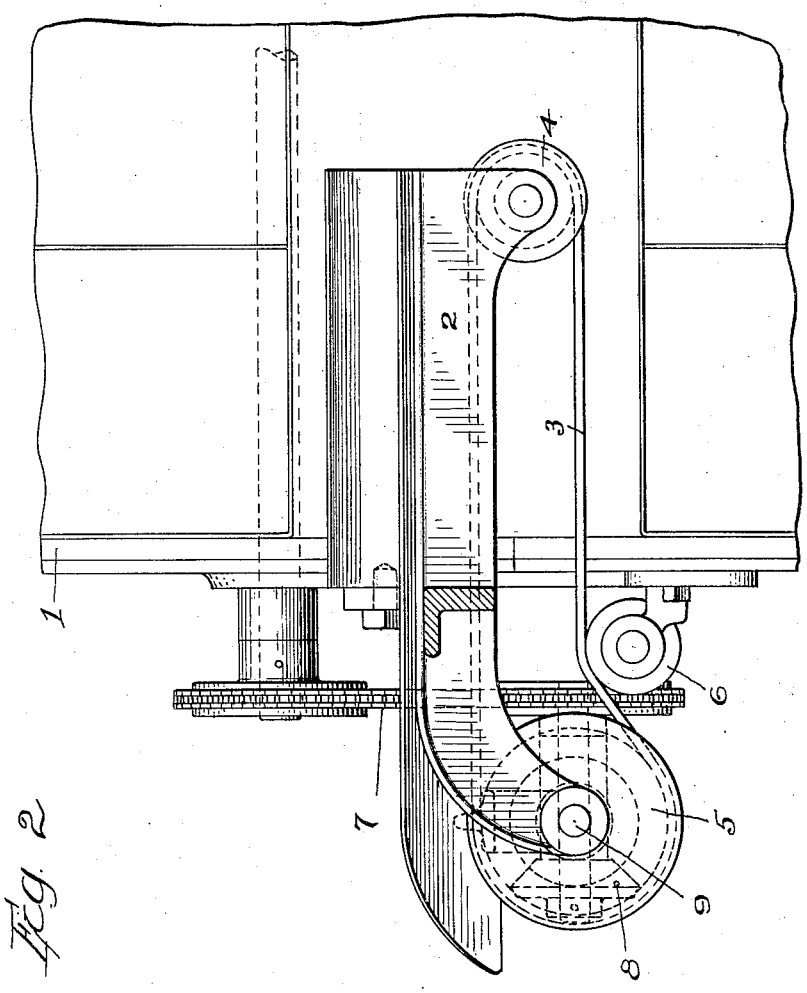
Figure 2 is a sectional side elevation taken on approximately the line 2—2 of Figure 3, and shows my improved discharge device somewhat enlarged to clearly show its construction from this direction.
Figure 3:
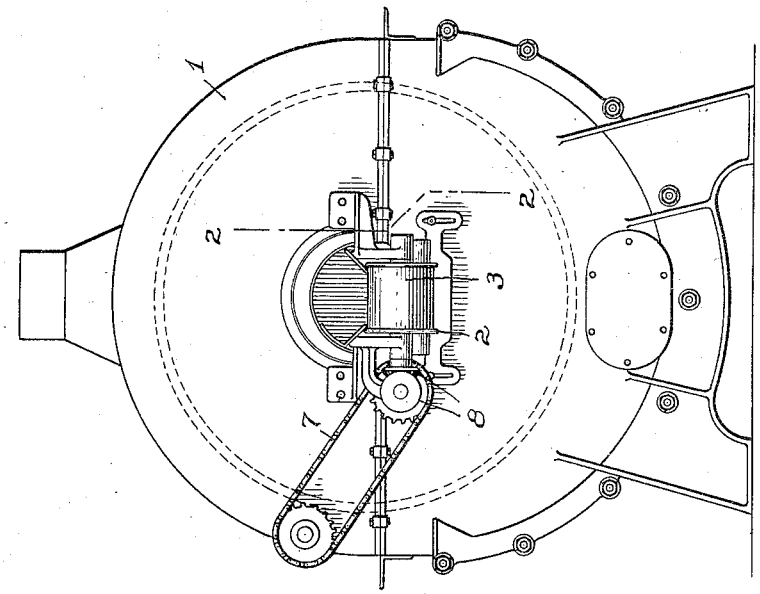
Figure 3 is an end elevation of a blancher with my improved discharge device attached and looking from the right of Figure 1.
Figure 4:
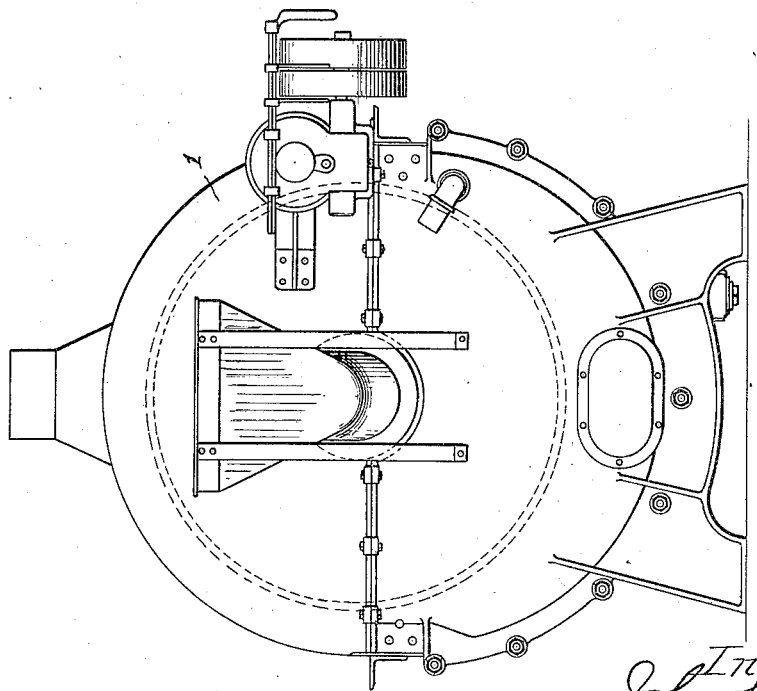
Figure 4 is an end elevation of the feed end of the blancher and shows an improved feed chute so placed that no material may work down between the outer and inner shells of the machine.
Figure 6:
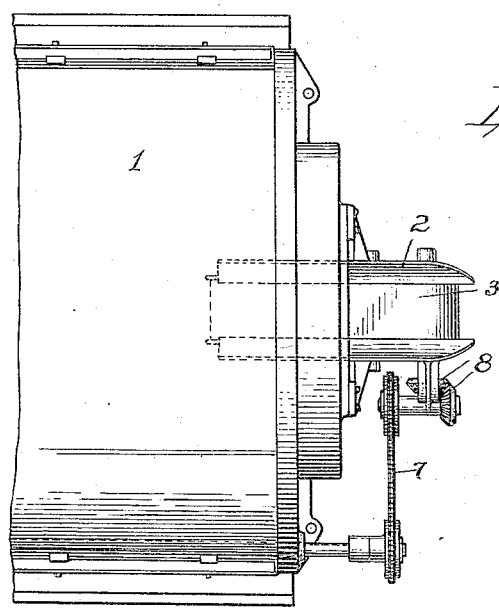
Figure 6 is a plan of the discharge end of the blancher and shows clearly the outer details and drive for my improved discharge device.

Referring particularly to Figs. 2 and 6, 2 represents a trough shaped member located in the discharge opening of the machine and is so shaped and placed that when the material is dumped onto the inner end of this member it is carried up by the rotation of the drum. A conveyor belt 3, is trained over this trough shaped member and is carried by the flanged pulleys 4 and 5 and is held in a properly tensioned condition by means of the adjustable idler pulley 6. Motion is transmitted to the conveyor belt 3 through the chain 7, mitre gears 8 and the short shaft 9. The continuously moving conveyor belt 3 has a constant urge against the material deposited thereon and keeps it moving toward the opening; prevents clogging and bridging of the material in the opening and provides a sure and safe method of discharging the great variety of materials handled by one of these machines in the ordinary cannery.

The improvement at the feed end of the blancher is most clearly shown in Fig. 5. This improvement rests in the location of the inner end of the feed chute in relation to the extension of the inner drum. The trouble that has been encountered at this point in the operation of this type of blancher has been that some of the material would find its way down between the inner and outer casings and gradually fill this space to the detriment of perfect operation. To obviate this difficulty I have provided a feed chute with an extended portion reaching down past the end wall of the drum so that the material fed into the machine will fall into the drum instead of into the mouth of the drum as has been the case. This construction obviates the difficulty at the feed end of the machine.

*Operation*

In the operation of this machine the material to be treated will be dumped promiscuously into the hopper of Fig. 5 from where it will pass through the inwardly extending inclined chute directly into the screen member of the blancher. The cylindrical extension on the screen member projecting through the opening in the outer shell and encircling the chute of the feed hopper completely covers the opening between the end of the rotary screen and the outer shell which is usually left for clearance.

It is through this clearance space, which is shown somewhat exaggerated in the drawings, that such material as peas, beans and like material finds its way during long periods of operation and cause a gradually filling up of the shell at this end of the apparatus and finally interferes materially with the efficient operation of the device.

The treatment of the material after it has been deposited into the interior of the blancher screen is treated substantially as is described in the Steere patent referred to.

When it reaches the discharge end, however, in the machines of my knowledge, there has always been more or less trouble in properly discharging materials of differing characteristics without making changes in the form of discharge means to suit the particular materials being handled. My improved discharge means will handle all material treated by a blancher in a thoroughly efficient and successful manner, and it will do this without any changes or adjustments whatsoever.

The discharge device comprising a short endless conveyor will receive and handle materials of any description, without mutilation or loss, and will operate continuously with the least amount of attention or effort from the operator. The material being blanched is carried up and around by the rotation of the screen member and when it reaches the discharge end of the apparatus it is dumped onto the inner end of the short conveyor and is immediately carried out of the screen by the continued movement of the conveyor and deposited in any manner desired for further treatment.

What I claim as new and desire to secure by Letters Patent is:

1. A unit apparatus for blanching vegetable materials comprising feed means, blanching means and discharge means, said blanching means consisting of an outer stationary shell or casing and an inner screen member mounted for rotation, said screen member having a reduced cylindrical extension at the feed end protruding through the outer casing and having no contact therewith, the said feed means comprising a hopper and an inclined chute entering said extension of said screen member and delivering material directly into said screen member and having no contact therewith, the discharge means of said unit consisting of a short endless belt extending a short distance into the discharge end of said screen member to receive material therefrom and deliver it outside of said screen member.

2. A unit apparatus for blanching vegetable materials comprising feed means, blanching means and discharge means arranged in successive order for cooperative operation, said blanching means including a rotary screen member having a reduced cylindrical extension at the feed end, the said feed means including an inclined chute entering said screen extension to deliver material directly into said screen member, the ends of said feed means and said extension being in overlapping relation but separated cylindrically so there is no contact therebetween, the discharge means of said unit consisting of a short endless conveyor extending a short distance into the discharge end of said screen member to receive material therefrom and deliver it away from said screen member.

3. A unit apparatus for blanching vegetable materials comprising feed means, blanching means and discharge means arranged in successive order for cooperative operation, said blanching means including a fixed casing and a rotary screen member within said casing with a clearance space between said casing and the feed end of said screen member, a cylindrical extension on the feed end of said screen member, an opening in the casing through which said cylindrical extension of said screen member protrudes and covers the clearance space between the casing and screen member, an inclined feed chute projecting into said cylindrical extension to deliver material, wholly inside of said extension directly into said screen member, the discharge means of said unit comprising an endless conveyor having its inner end projected a short distance into the discharge end of said screen member and its outer end beyond said screen member and adapted to receive material from said screen member and convey it away from said apparatus.

4. A unit apparatus for treating vegetable materials comprising feed means, screen means, discharge means, treating means and power means, the screen means of said unit apparatus comprising a casing and a screen member within said casing with a clearance space between said casing and said screen means, a cylindrical extension on the feed end of said screen means, an opening in said casing through which said cylindrical extension protrudes and covers the said clearance space at this point, the feed means of said unit apparatus comprising a hopper and an inclined chute, the said chute extending through the said cylindrical extension of said screen member and delivering material directly into said screen member beyond the cylindrical extension, the discharge means of said unit apparatus comprising a short endless conveyor one end of which protrudes a short distance within said screen member and the other end projects beyond said screen member and adapted to receive a variety of material from said screen member and move it away from said screen member, the treating means of said unit apparatus comprising means for admitting a treating medium into the said casing and for removing the residue of said material from said casing.

In testimony whereof I affix my signature.

JOHN SCHMIDT.